3,160,622
PROCESS FOR POLYMERIZING OLEFINS
UTILIZING A ZIEGLER CATALYST
William I. Gilbert, Oakmont, Bernard H. Gwynn, Fawn Township, Allegheny County, Russell G. Hay, Fox Chapel, and John G. McNulty, Glenshaw, Pa., assignors to Goodrich-Gulf Chemicals, Inc., Pittburgh, Pa., a corporation of Delaware
Filed Jan. 10, 1957, Ser. No. 633,481
5 Claims. (Cl. 260—94.9)

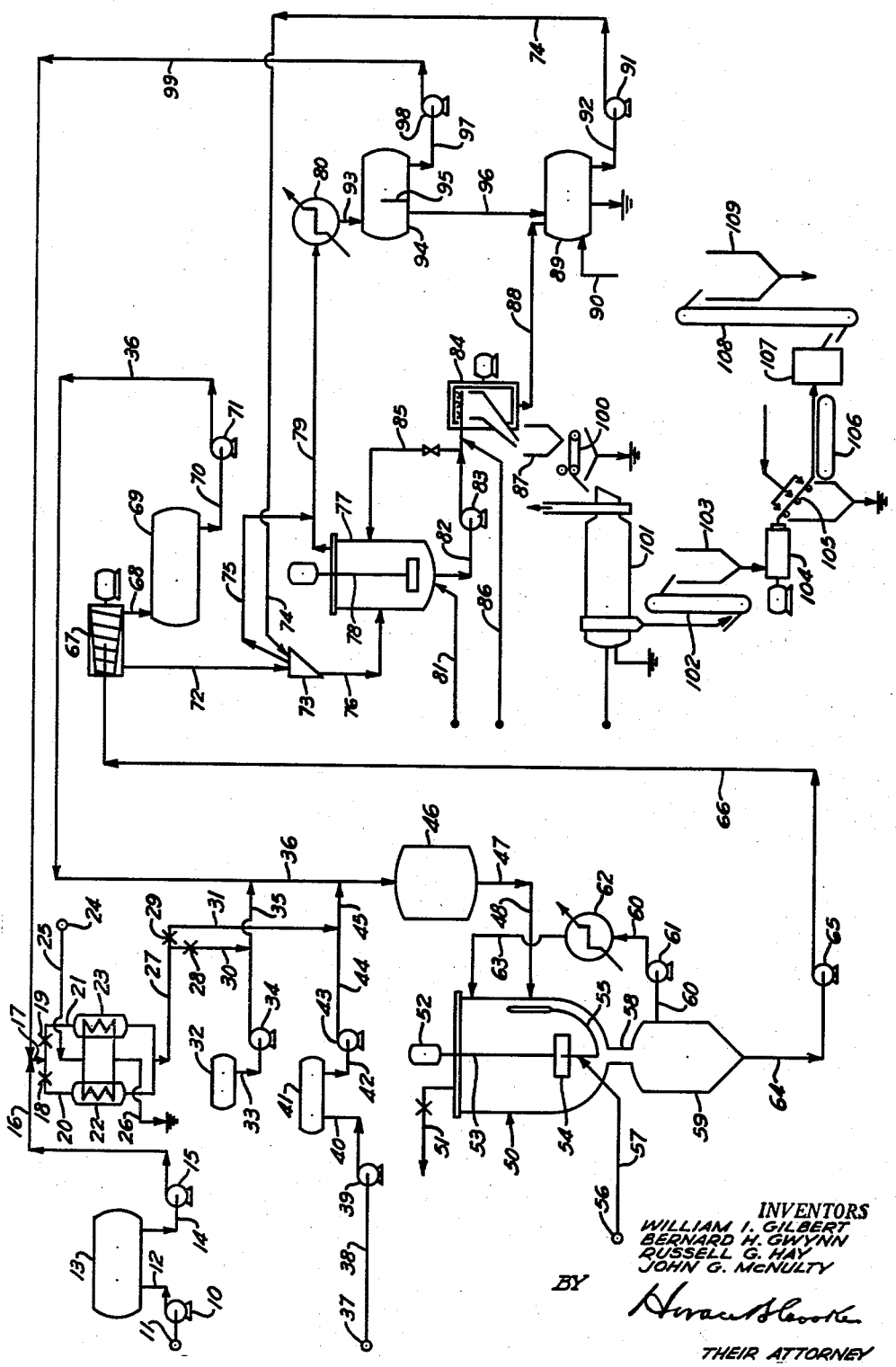

This invention relates to an improved process for the polymerization of lower molecular weight olefins and particularly ethylene to form solid polymers and relates more specifically to the production of polyethylene in a continuous manner to yield polyethylenes of controlled molecular weight.

A low pressure ethylene polymerization process is described in the application of Karl Ziegler, Serial No. 469,059, filed November 15, 1954. The present invention is concerned with an improved process of this type and involves carrying out the polymerization of ethylene in an inert liquid reaction medium, preferably a hydrocarbon solvent, in the presence of a catalyst comprising an organo-aluminum compound and a heavy metal compound. The organo-aluminum compound contains at least one hydrocarbon radical linked through a carbon atom directly to the aluminum. Organo-aluminum compounds that can be employed can be represented by the structural formula:

wherein

R is a hydrocarbon radical such as an alkyl, aralkyl, aryl, alkaryl, or cycloalkyl radical, exmples of such radicals being ethyl, propyl, isobutyl, amyl, hexy, dodecyl, phenyl-ethyl, benzyl, phenyl, ethylphenyl, tertiarybutylphenyl, and cyclohexyl radicals;

R' is also a hydrocarbon radical as above defined, an OR radical, hydrogen, or halogen such as chlorine, bromine, iodine, and fluorine; and R" is hydrogen or a hydrocarbon radical as defined above.

Examples of such organo-aluminum compounds are triisobutylaluminum, diisobutylaluminum hydride; dipropylaluminum chloride, phenylaluminum dihydride; dioctylaluminum bromide; cyclohexyl-bromo-aluminum hydride, ditertiarybutylphenylaluminum hydride— n-pentylisobutylaluminum chloride; dioctylaluminum hydride; and dipropylcyclohexyl aluminum.

The heavy metal compound constituting a component of the catalyst is a compound of a metal occupying the fourth to the sixth positions of the long periods of the Periodic Table in which the elements are arranged in short and long periods and the alkali metals occupy the first position (see Periodic Chart of the Elements on pages 392 and 393 of the 36th edition of "Handbook of Chemistry and Physics, 1954–1955," published by Chemical Rubber Publishing Company). These metals are titanium, zirconium, hafnium, vanadium, niobium (columbium), tantalum, chromium, molybdenum, tungsten and metals in the corresponding positions in the last long period in the so-called "actinium series," that is, thorium, protactinium and uranium. The preferred heavy metal compounds are the salts of the heavy metal with monovalent anions. Especially preferred are the halides (chlorides, bromides, iodides and fluorides) and acetyl acetonates of titanium, zirconium and thorium. Titanium halides, especially titanium chlorides, constitute preferred heavy metal compounds. Other heavy metal compounds include other inorganic salts of the metals such as oxyhalides, sulfates, nitrates and sulfides and other organic salts such as acetates and oxalates of the heavy metals.

The polymerization process as described in the application of Karl Ziegler, referred to above, is carried out by contacting ethylene with a reaction mixture consisting of an inert liquid reaction medium containing both of the catalyst components. The introduction of ethylene is continued until no further reaction takes place and thereafter the contents of the vessel are removed and the resultant polymer is separated from the solvent and catalyst components.

In this type of operation it is difficult to make an ethylene polymer having a narrow range of molecular weights and particularly it is difficult to reproduce results from one run to another. Moreover, the necessary technique is complicated and time-consuming. In order to insure the absence of air or oxygen, the reaction vessel is ordinarily first pressured with nitrogen, the catalytic reaction medium is then introduced, and ethylene is introduced to displace the nitrogen and form the polymer. It is necessary to clean the vessel of adhering polymer before another run can be started.

We have discovered in accordance with the invention that by proceeding as described in detail hereinafter, ethylene polymers of more uniform molecular weights can be efficiently prepared. The process of the invention comprises flowing a catalytic reaction medium comprising an inert liquid reaction medium and catalyst components of the class described above continuously into the upper part of a reaction vessel provided with agitating and stirring means and introducing ethylene into the reaction vessel, preferably at a rate such that unconverted ethylene is continuously removed from the top of the vessel. Polymerization conditions of temperature and pressure are maintained in the reaction vessel, these conditions being substantially normal temperatures and relatively low pressures. Under these conditions and with agitation, the ethylene is polymerized into solid ethylene polymers which take the form of small solid particles initially. These particles continue to grow in size as they remain in the reaction vessel and tend to settle through the reaction medium. The larger particles also tend to adhere to the sides of the reaction vessel and to the agitating means. In accordance with our invention the reaction medium containing the polymer, as well as dissolved ethylene, is continuously withdrawn from the bottom of the reaction vessel and passed into a holding tank which, being in direct contact with the reaction vessel, is also maintained at polymerization conditions of temperature and pressure. This tank is free of obstructions and serious sticking problems are avoided. The polymerization of the ethylene is completed in this holding zone where the adhering and agglomerating properties of the polymer particles are not a serious disadvantage.

The process also preferably comprises forming the catalytic reaction medium (i.e., the inert liquid reaction medium and the catalyst components) by first forming a solution of the organo-aluminum compound in the inert liquid reaction medium, incorporating the heavy metal compound in this solution, as such or preferably in solution in the inert liquid reaction medium, then flowing it into the reaction zone.

In carrying out the process of the invention it is important to employ a purified ethylene, a purified inert liquid reaction medium, especially with respect to the removal of water and peroxide therefrom, and catalyst components substantially free of oxygen and oxygenated compounds. The catalyst components should be employed in ratios of the organo-aluminum compound per mol of the heavy metal compound between about 0.2 and 4.0 and preferably between about 0.5 and 1.5. While maintaining these ratios between the organo-aluminum compound and the heavy metal compound, the catalyst components should be employed in amounts such that there is between 1 millimol and 10 millimols of the organoaluminum compound per liter of reaction medium and preferably between about 2 millimols and 5 millimols.

As indicated above, the inert liquid reaction medium is preferably a hydrocarbon solvent. Aromatic solvents and paraffinic solvents may be used such as, for example, benzene, toluene, heptane, hexane, octane and the like. The solvent used has an effect upon the polymerization. Aromatic solvents, for example, benzene, tend to produce under otherwise substantially equivalent conditions, polymers which have lower average molecular weights than polymers produced using paraffinic solvents. The reaction temperatures employed in the present process are the same as those previously employed. Preferred reaction temperatures fall between about 0° and 100° C. The reaction pressure should be at least sufficient to effect solution of ethylene in the reaction medium and can be as high as about 500 pounds per square inch. The pressure, however, must be controlled in accordance with other factors affecting the process. The polymerization reaction is exothermic and therefore to maintain a selected temperature, means for cooling must be provided. The rate of reaction is accelerated at high pressures in the broad range specified and therefore more heat must be removed. We have found that satisfactory cooling and rates of reaction are obtained at pressures of about 25 to about 100 pounds per square inch gauge and preferably about 50 to about 80 pounds per square inch.

The optimum residence time for the reaction constituents in the reaction zone will depend upon such factors as the inert liquid reaction medium and the specific catalyst components employed. However, the residence time should generally be between about one-half and five hours.

Our process is illustrated in the following description of an example of polymerization read in connection with the patent drawing, the single figure of which is a schematic flow diagram of a preferred embodiment of the process of this invention.

Referring now to the drawing, purified normal heptane, from which a top fraction has been distilled to remove volatile contaminants and dissolved gases, is pumped from a source 11 by pump 10 through a line 12 into a storage tank 13 which has a capacity of about 10,000 gallons. Heptane is withdrawn from storage tank 13 through line 14 by pump 15 and is pumped thereby through line 16 at a rate of 720 gallons per day into admixture in line 17 with recycled heptane, flowing therein at a rate of 11,376 gallons per day. The solvent heptane is caused by operation of valves 18 and 19 to flow through line 20 or 21 into silica gel driers 22 or 23, respectively. Generally, one of the driers will be in operation while the other is shut down for regeneration of the silica gel. Steam to activate the silica gel driers and maintain the purification temperature flows to the driers from a source 24 through line 25 and from the driers through line 26. Dried purified heptane flows from the drier 22 or 23 through line 27 and by operation of valves 28 and 29 can be directed in any selected proportion through line 30 or line 31.

Titanium tetrachloride, which is stored in a stainless steel 500 gallon feed tank 32, is withdrawn therefrom through line 33 by pump 34 which pumps this component of the catalyst complex at a rate of 143 gallons per day through line 35 into juncture with line 30 and admixture with solvent heptane flowing therein. The titanium tetrachloride in solution flows through line 35 to juncture with line 36 in which it encounters recycled solvent and catalyst.

Triisobutyl aluminum is delivered from a source 37 through a line 38 by pump 39 and is pumped thereby through line 40 into a storage tank 41 having a capacity of 1500 gallons. The triisobutyl aluminum is withdrawn from the storage tank 41 through line 42 and is pumped by pump 43 at a rate of 160 gallons per day through line 44 into juncture with line 31 and into solution in the heptane flowing therein. The heptane solution of triisobutyl aluminum flows through line 45 into line 36 wherein the solution of catalyst mixes with recycled solvent and the titanium tetrachloride catalyst component.

Catalyst components in solvent heptane flow from line 36 into a storage drum 46 of sufficient volume that the fresh catalyst therein can be permitted to age for a period between about 5 and 30 minutes. Controlled aging of the catalyst exhibits varying effects upon yield and molecular weight of product. Generally speaking, increased reaction rates, and consequently increased yields for a given reactor residence time, will result from aging the catalyst for a period of about 10 minutes when low catalyst concentrations are employed. Catalyst and heptane flow from the drum 46 through line 47 and line 48 into a stainless steel polymerization reactor 50.

Reactor 50 is supplied with a valved vent line 51 and a mixing means which comprises a motor 52, drive shaft 53 and paddle blade 54. The mixing means is designed to revolve at an adjustable rate of between about 400 and 1600 r.p.m. In addition, the mixing means can include a scraper blade 55 to scrape deposited polymer from the inner surface of the reactor 50.

The reactor is constructed of stainless steel, has a capacity of 6500 gallons, an inside diameter of 10 feet, and is preferably operated about two-thirds filled. During operation ethylene which has been purified by known means, not shown, is delivered into the reactor from a source 56 through line 57 at a rate of at least 3300 pounds per hour. Fresh catalyst is delivered to the reactor at a rate of 143 gallons per day of titanium tetrachloride component and 160 gallons per day of triisobutyl aluminum component. This will provide a mol ratio in the reactor of aluminum to titanium of about 1:2. Reaction is performed at a temperature of about 60° C., cooling means hereinafter described being used to remove about 1155 B.t.u. per pound of ethylene of exothermic heat. The pressure is about 50 pounds per square inch gauge. The polymerization zone must be free of air or oxygen, which, as aforementioned poisons the reaction. Reaction under the foregoing conditions yields at least 25 pounds of polymer per pound of catalyst complex. Although the process can be operated successfully under conditions of ethylene flow such that all of the ethylene charged is converted to polymer, it is usually advantageous to vent through vent line 51 at least 5 percent by weight of the ethylene charged, as this prevents build-up in the reactor of inert gases and gaseous decomposition products. The amount of ethylene vented should preferably not exceed 15 percent by weight of the ethylene charged.

We have found that agitation of the reaction mixture considerably enhances the reaction rate and that, in order to obtain a product of relatively uniform average molecular weight, the degree of agitation should be above a certain determined minimum amount. This can be determined experimentally for each size and shape of reactor. For example, we have found that in a reactor of the type illustrated by reactor 50, a stirring rate of higher than 500 r.p.m. and preferably 600 r.p.m. provided optimum results and that increasing this stirring rate to 1200 r.p.m. did not noticeably affect the molecular weight or increase the reaction rate.

As polymer forms in the reactor 50 it will settle in the thickened slurry and flow through open discharge funnel 58 into holding tank 59 of 1000 gallons capacity. The interior of the holding tank 59 is free of all obstruction; the inner surface can be polished alloy steel, e.g., stainless steel.

As previously noted herein, the employment of especially the lower catalyst concentrations within the range herein disclosed, which low concentrations are especially feasible in continuous operation, reduces the problem of polymer build-up.

We have observed in batch experiments that the tendency of the polymer to adhere to objects becomes more pronounced during the last part of the reaction period. The said holding tank 59 is thus provided so that as polymer forms and settles in the reaction zone, it will descend into the holding tank and there polymerization will be completed in the absence of objects to which the polymer can readily adhere. This holding tank also permits ethylene that is not polymerized to escape and rise through the funnel 58 into the reactor zone. Thus our process includes the improvement in polymerizing ethylene in which the last stages of polymerization are carried out in a separate quiescent zone that is free of apparatus to which the polymer can stick.

In order to maintain the reaction mixture in the reactor 50 and the holding tank 59 at the desired temperature, solvent containing dissolved or suspended catalyst is removed from the upper portion of tank 59 through line 60 by means of pump 61. At the upper portion of the holding tank, the solvent will be relatively free of suspended polymer and if necessary, the passage of polymer into line 60 can be prevented by means of a screen disposed across the mouth of this line. This recycled solvent passes through cooler 62 and line 63 into the upper portion of reactor 50. In the operation being described, about 4200 gallons per hour of solvent are removed from holding tank 59 and about 3,660,000 B.t.u. per hour are removed from the recycled solvent so that the temperature of the recycled solvent entering the reactor 50 is about 38° C.

A thickened slurry of polyethylene in solvent is withdrawn from the holding tank 59 through line 64. Settled polymer slurry flowing from tank 59 through line 64 is pumped by pump 65 through line 66 at a rate of 26,600 pounds per hour into a continuous centrifuge 67.

Heptane possibly containing some catalyst is separated from polymer in the centrifuge 67, and flows therefrom through line 68 into solvent accumulator tank 69 from which it is pumped through line 70 and pump 71 into line 36 at a rate of about 21,000 pounds per hour. Concentrated slurry of polymer in heptane flows from the centrifuge 67 at a rate of about 5700 pounds per hour through line 72 into a stainless steel washer 73 in which water is employed to wash the polymer particularly to remove catalyst therefrom. Water is introduced into washer 73 through line 74 at a rate of 109 gallons per minute and a temperature of 88° C. The elevated temperature of washing requires a vent 75 for the release of vapors from the washing step. A slurried mixture of water and concentrated polymer in solvent is withdrawn from the washer 73 through line 76 into a stainless steel solvent flash tank 77 having an agitating means 78 and a capacity of about 1700 gallons.

Solvent is continuously distilled from the slurry in tank 77 and distillate flows therefrom through line 79 to a condenser 80. Vapors from washer 73 pass into line 79 through line 75. Steam is introduced into the tank 77 through line 81 to distill the solvent therein. Still bottoms are withdrawn from the solvent flash tank 77 through line 82 by pump 83 at a rate of 738 gallons per minute and are delivered into centrifuge 84. A portion of such distillation bottoms can also be recycled by the pump 83 through a valved recycle line 85 into the flash tank 77. The continuous centrifuge 84 can represent one or a plurality of centrifuges in which can be performed one or several washing steps. Wash liquid is introduced through line 86 into the centrifuge 84. Generally the wash liquid will consist of water which is delivered to the centrifuge at the rate of about 32 gallons per minute. The wash liquid can also consist in part of an organic solvent, for example, methanol. The wash liquid can also consist of water and methanol which has been acidified or alkalized. The polymer washing method can also include combinations of the above wash steps in which, for example, the polymer is washed first with methanol and an acid, then with methanol and an alkali and finally with a neutral methanol wash liquid. Solid polymer is withdrawn from the centrifuge 84 into a hopper 87. Solvent, wash liquid and water are removed from the centrifuge 84 and flow through line 88 into a collecting tank 89 to which steam is delivered through line 90. Hot wash liquid and/or water can be pumped from the tank 89 by pump 91 through lines 92 and 74 into the washer 73.

Heptane vapors that are condensed in the condenser 80 flow therefrom at a temperature of about 50° C. through line 93 into a separating tank 94 having a baffle or like separating means 95. Water which settles out of the condenser flows through a line 96 into the collecting tank 89. Heptane separated in the separator 94 flows through a line 97 and is pumped by pump 98 through line 99 to juncture with line 16 and thence through line 17 into the silica gel driers 22 or 23.

Solid polymer from the hopper 87 is delivered to squeeze rolls 100 by which the water content of the polymer is reduced to about 45 percent by weight of dry polymer. The partially dried polymer is then delivered into steam tube drier 101. The product of this drier is a white fluffy polymer which can have an average molecular weight between about 20,000 and 100,000, depending upon the conditions selected, and which, under any selected set of conditions, will vary no more than the variations to be expected in the employed method of estimating molecular weights. These known methods include estimations from the Melt Index, or from the intrinsic viscosity of the product in tetralin at 130° C. (J. Poly. Sci. 8, p. 651, 1952; ASTM D1238–52T).

Polyethylene in the form of a light, fluffy mass of finely divided particles is removed from the steam tube drier 101 and carried by elevator 102 into hoppers 103 whence it can be directed to extruder 104. The extruded material is separately cooled by coolers 105 and can then be conveyed by a conveyor 106 to cutting machine 107 from which the particulate extruded polyethylene is elevated by elevator 108 into storage hoppers 109.

*Example I*

Ethylene was passed continuously into a reaction medium consisting of normal heptane in which was dissolved 10 millimols of titanium tetracholride and 10 millimols of diethyl aluminum bromide per liter of normal heptane. The ethylene was passed into the reaction medium at a rate such that 12.4 percent of the ethylene charged was vented from the reactor, preventing an accumulation of other compounds in the reaction zone. As polymer was formed and settled in the reaction zone it was substantially continuously withdrawn with heptane at a rate such as to maintain an average reactor residence time of 0.85 hour. The temperature of the reaction was maintained by external cooling at about 60° C. and the pressure at slightly above atmospheric. During the course of the continuous polymerization the reaction mixture was continuously stirred at a rate of 600 r.p.m. Polymer samples taken during the operation of the continuous polymerization process exhibited a Melt Index of between 0.85 and 0.52 corresponding to an average molecular weight ranging from 55,000 to 62,000, which variation is substantially within the range of experimental error. A yield of 38 grams of polyethylene polymer per gram of titanium tetrachloride was obtained.

Trioctyl aluminum and ethyl aluminum sesquibromide were each used as the aluminum component of the catalyst in similar runs except that a semi-continuous type operation was employed. Trioctyl aluminum tends to give a product of higher molecular weight.

*Example II*

Ethylene was polymerized in a liquid reaction medium consisting of normal heptane at slightly above atmospheric pressure and a temperature of about 60° C. which was maintained by external cooling. The reaction medium contained 5 millimols of aluminum triisobutyl and 10 millimols of titanium tetrachloride per liter of heptane. Ethylene was introduced at a rate such that 20.8 percent by weight of the ethylene was vented from the reaction zone, and polymer and solvent were removed from the reactor at such average continuous rate that a residence time of approximately 0.89 hour was maintained. Polymer samples taken during the run exhibited a Melt Index of 0.81 to 0.34 corresponding to a molecular weight of 56,000 to 67,000. A yield of 37 grams per gram of titanium tetrachloride was obtained. The rate of stirring was substantially the same as that of Example I.

*Example III*

Ethylene was passed continuously into normal heptane in which was dissolved 5 millimols of aluminum triisobutyl and 10 millimols of titanium tetrachloride per liter of the reaction medium at a rate such that 10.7 percent by weight of the ethylene was vented from the reaction zone. Reaction temperatures were maintained at about 60° C. by external cooling and the pressure was slightly higher than atmospheric. The rate of stirring was substantially the same as Example I. Ethylene was continuously introduced at such rate and polymer and solvent were removed from the reaction zone at such rate as to establish an average residence time of 1.10 hours. A yield of 50 grams of polyethylene per gram of titanium tetrachloride was obtained. The polymer removed from the reactor during the performing of the run exhibited Melt Indexes between 1.22 and 0.55 corresponding to a range of average molecular weight between 50,000 and 61,000.

*Example IV*

Ethylene was continuously polymerized under substantially the same conditions employed in Example III, normal heptane being used as the reaction medium and the catalyst complex consisting of 5 millimols of aluminum triisobutyl and 10 millimols of titanium tetrachloride per liter of heptane. In this example, ethylene was continuously introduced and vented at such rate and polymer and solvent were removed from the reaction zone at such rate as to establish an average residence time of 0.45 of an hour. 8.2 percent by weight of the ethylene was vented. This reduced residence time substantially reduced the yield which was 30 grams of polyethylene per gram of titanium tetrachloride but had little effect on the Melt Index which ranged from 0.82 to 0.63 corresponding to an average molecular weight which ranged between 56,000 and 59,000.

*Example V*

The run reported in Example IV was repeated under substantially the same conditions except that ethylene was introduced and vented, and polymer and solvent were removed at a rate such that a residence time of only 0.3 hour was established. 17.7 percent by weight of the ethylene was vented from the reaction zone. The yield was severely reduced to 13 grams of polyethylene per gram of titanium tetrachloride, the Melt Index was increased to 2.34 to 0.94, and the average molecular weight was lowered to a range between 41,000 and 54,000.

Thus the residence time of the ethylene in the reactor should be at least about ½ hour and preferably not substantially greater than one to two hours.

*Example VI*

Even lower catalyst concentrations than those above employed have been used successfully in the continuous polymerization of ethylene. In this example 6 millimols per liter of aluminum triisobutyl and 3 millimols per liter of titanium tetrachloride in heptane were employed. The titanium catalyst component was presaturated in heptane with ethylene according to the method of copending application of Russell G. Hay, Serial No. 609,051, filed September 11, 1956 and now abandoned. Ethylene was continuously introduced into the heptane and polyethylene and heptene were removed at a rate establishing a residence time of 0.6 hour. A yield of polyethylene of 45 grams per gram of titanium catalyst component was obtained. The polyethylene that was removed from the reactor throughout the run exhibited Melt Index range of 1.22 to 1.04 corresponding to an average molecular weight of 49,000 to 52,000.

Reducing the catalyst concentration in continuous operation to as low as 2 millimols of titanium component per liter of reaction medium appeared to show some deleterious effect upon the total yield of polymer, but at concentrations above 2 millimols, as above, yields remained at high levels, both on a total yield basis and on a basis of yield per unit weight of titanium catalyst component.

*Example VII*

In this example the reaction was carried out with the use of a reactor having a cylindrical pipe substantially as long as the height of the reactor and having a diameter equal to one-fourth the diameter of the reactor connected to the bottom and in direct communication with the interior of the reactor. Benzene was used as the reaction medium and in it were dissolved 3 millimols of aluminum triisobutyl per liter of benzene and 6 millimols of titanium tetrachloride per liter. Ethylene and the reaction medium containing dissolved catalyst were introduced continuously into the reactor while stirring and polyethylene and medium were continuously removed at rates such as to establish an ethylene residence time of about 0.55 hour. 12.6 percent by weight of the ethylene was vented continuously from the reactor. The mixture in the lower part of the reactor flowed into the pipe or settling chamber, and the final polyethylene product and medium were removed from this chamber. The polymer recovered during the first 1½ hours of this run had a Melt Index of 1.53 and the polymer collected at the end of each of the next four hours and the end of a final half hour had Melt Indexes of 0.373, 0.301, 0.286, 0.319 and 0.337. The polymer collected after the first 1½ hours therefore had a molecular weight of about 48,000 and the polymer collected at the later intervals of the process had molecular weights varying only from 66,000 to 69,000. The yield over the six hour period was 34 grams of polyethylene per gram of titanium tetrachloride.

From the foregoing examples it is apparent that the process of the invention results in the production of a polyethylene having a relatively narrow range of molecular weights, the particular type of polyethylene from a molecular weight standpoint obtained being dependent upon the specific conditions and catalyst constituents employed. The results obtained using the process described in Example VII, in which the reaction mixture in being removed from the reaction zone first passed into a relatively quiescent zone, are particularly noteworthy. Within the accuracy of the procedure used, the polymers collected in the last four and one-half hours were of the same molecular weight.

These results are believed also to indicate that the range of molecular weights of the polyethylenes making up the sample tested is very narrow. This is shown particularly by the fact that the polyethylene obtained in the last half hour of the run described in Example VII had substantially the same molecular weight as the polymer first obtained after the run had lined out. These results may be contrasted with the results obtained in batch operations using aluminum triisobutyl and titanium tetrachloride as the catalyst components and benzene as the liquid reaction medium. These batch operations were carried out at a temperature of about 60° C. In one example which was conducted for a period of 15 minutes, the polyethylene obtained had a Melt Index of 0.15, corresponding to a molecular weight of 78,000. In another example carried out for 45 minutes under the same conditions, the polyethylene obtained had a Melt Index of 0.026 which corresponds to a molecular weight of 102,000, and in a third example carried out for 120 minutes, the polyethylene obtained had a Melt Index of 0.008, corresponding to a molecular weight of above 110,000.

In similar batch operations using diethyl aluminum bromide and titanium tetrachloride as the catalyst components, heptane as the reaction medium and a reaction temperature of about 60° C., polyethylene having a Melt Index of 0.018, corresponding to a molecular weight of 107,000, was obtained in a test carried on for 180 minutes, while in a test carried on for 45 minutes polyethylene having a Melt Index of 0.980, corresponding to a molecular weight of 53,000, was obtained.

Although the specific description has been concerned mainly with the production of polyethylene, it will be understood that the present process can be employed with advantage for the polymerization of other olefins containing not more than four carbon atoms (i.e. propylene and 1-butylene) and copolymers of these olefins with one another and with ethylene. The process has particular application to the preparation of copolymers of ethylene with these olefins, particularly propylene, as it makes possible the production of copolymers of relatively uniform molecular weight and percentage content of the other olefin. The copolymerization of ethylene with propylene proceeds more slowly than the polymerization of ethylene itself. Therefore, the preferred procedure of venting the charged olefin or olefins prevents build-up in the reaction zone of the slower reacting olefin and permits the formation of copolymers of relatively uniform composition.

Obviously many modifications and variations of the invention as hereinabove set forth may be made without departing from the spirit and scope thereof and therefore only such limitations should be imposed as are indicated in the appended claims.

We claim:

1. A process of polymerizing an olefin which comprises continuously flowing a catalytic reaction medium comprising an inert liquid reaction medium, a catalyst component consisting of an organo-aluminum compound containing at least one hydrocarbon radical linked through a carbon atom to the aluminum and another catalyst component consisting of a compound of a heavy metal selected from the metals occupying the fourth to the sixth positions of the long periods of the Periodic Table into a reaction zone while maintaining in said reaction zone polymerizing conditions of temperature and pressure, mechanically agitating said catalytic reaction medium in said reaction zone, continuously flowing at least one olefin containing not more than four carbon atoms into said reaction zone and into contact with said catalytic reaction medium to form solid polyolefin particles in said catalytic reaction medium, continuously withdrawing from the bottom of said reaction zone a slurry of said catalytic reaction medium and solid particles of polyolefin containing dissolved olefin into a quiescent receiving zone maintained under polymerizing conditions of temperature and pressure wherein polymerization of olefin introduced into said reaction zone is completed, removing the resulting slurry from said receiving zone and recovering solid polyolefin from said slurry.

2. A process of polymerizing ethylene which comprises continuously flowing a catalytic reaction medium comprising an inert liquid hydrocarbon solvent, a catalyst component consisting of an organo-aluminum compound containing at least one hydrocarbon radical linked through a carbon atom to the aluminum and another catalyst component consisting of a compound of a heavy metal selected from the metals occupying from the fourth to the sixth positions of the long periods of the Periodic Table into a reaction zone while maintaining in said reaction zone polymerizing conditions of temperature and pressure, mechanically agitating said catalytic reaction medium in said reaction zone, continuously flowing ethylene into said reaction zone and into contact with said catalytic reaction medium to form solid polyethylene particles in said catalytic reaction medium, continuously withdrawing from the bottom of said reaction zone a slurry of said reaction medium and solid particles of polyethylene containing dissolved ethylene into a quiescent receiving zone maintained under polymerizing conditions of temperature and pressure wherein polymerization of ethylene introduced into said reaction zone is completed, removing slurry from said receiving zone, and recovering solid polyethylene from said slurry.

3. A process of polymerizing ethylene which comprises continuously flowing a catalytic reaction medium comprising an inert liquid hydrocarbon solvent, a catalyst component consisting of an organo-aluminum compound containing at least one hydrocarbon radical linked through a carbon atom to the aluminum and another catalyst component consisting of a compound of a heavy metal selected from the metals occupying from the fourth to the sixth positions of the long periods of the Periodic Table into a reaction zone while maintaining in said reaction zone a temperature of about 0° to about 100° C. and a pressure of about 25 to about 100 pounds per square inch gauge, mechanically agitating said catalytic reaction medium in said reaction zone, continuously flowing ethylene into said reaction zone and into contact with said catalytic reaction medium to form solid polyethylene particles in said catalytic reaction medium, continuously withdrawing from the bottom of said reaction zone a slurry of said reaction medium and solid particles of polyethylene containing dissolved ethylene into a quiescent receiving zone maintained under polymerizing conditions of temperature and pressure, continuously flowing said hydrocarbon solvent substantially free of polyethylene particles from said receiving zone, cooling said removed solvent, flowing the resulting cooled solvent into said reaction zone to cool said catalytic reaction medium, removing slurry from said receiving zone, and recovering solid polyethylene from said last-named slurry.

4. A process of polymerizing ethylene which comprises continuously flowing into an aging zone a catalytic reaction medium comprising an inert liquid reaction medium, a catalyst component consisting of an organo-aluminum compound containing at least one hydrocarbon radical linked through a carbon atom to the aluminum and another catalyst component consisting of a compound of a heavy metal selected from the metals occupying the fourth to the sixth positions of the long periods of the Periodic Table, continuously removing from said aging zone the catalytic reaction medium at a rate such that said catalytic reaction medium remains in said aging zone for at least five minutes, continuously flowing said catalytic reaction medium into a reaction zone while maintaining in said reaction zone polymerizing conditions of temperature and pressure, mechanically agitating said catalytic reaction medium in said reaction zone, continuously flowing ethylene into said reaction zone and into contact with said catalytic reaction medium to polymerize the ethylene and form solid polyethylene particles in said catalytic reaction medium, continuously withdrawing from the bottom of said reaction zone a slurry of said catalytic reaction medium and solid particles of polyethylene containing dissolved ethylene into a quiescent receiving zone maintained under polymerizing conditions of temperature and pressure wherein polymerization of ethylene introduced into said reaction zone is completed, removing resulting slurry from said receiving zone, and recovering solid polyethylene from said last-mentioned slurry.

5. A process of polymerizing ethylene which comprises continuously flowing into an aging zone a catalytic reaction medium comprising an inert, liquid hydrocarbon solvent, a catalyst component consisting of an organo-aluminum compound containing at least one hydrocarbon radical linked through a carbon atom to the aluminum and another catalyst component consisting of a compound of a heavy metal selected from the metals occupying the fourth to the sixth positions of the long periods of the Periodic Table, continuously removing from said aging zone the catalytic reaction medium at a rate such that said catalytic reaction medium remains in said aging zone for at least five minutes, continuously flowing said catalytic reaction medium into a reaction zone while maintaining in said reaction zone a temperature of about 0° to about 100° C. and a pressure of about 50 to about 80 pounds per square inch gauge, mechanically agitating said catalytic reaction medium in said reaction zone, continuously flowing ethylene into said reaction zone and into contact with said catalytic reaction medium to polymerize the ethylene and form solid polyethylene particles in said catalytic reaction medium, continuously withdrawing from the bottom of said reaction zone a slurry of said catalytic reaction medium and solid particles of polyethylene containing dissolved ethylene at a rate such as to establish in said reaction zone a residence time of about one-half to about 5 hours, into a quiescent receiving zone maintained under polymerizing conditions of temperature and pressure wherein polymerization of ethylene introduced into said reaction zone is completed, continuously flowing said hydrocarbon solvent substantially free of polyethylene particles from said receiving zone, cooling said removed solvent and continuously flowing the resulting cooled solvent into said reaction zone to cool said catalytic reaction medium, continuously removing resulting slurry from said receiving zone and recovering solid polyethylene from said last-mentioned slurry.

References Cited in the file of this patent
UNITED STATES PATENTS

| | | |
|---|---|---|
| 2,731,453 | Fields et al. | Jan. 17, 1956 |
| 2,745,823 | Hewitt | May 15, 1956 |
| 2,885,389 | Schappert | May 5, 1959 |
| 2,943,083 | Kolling et al. | June 28, 1960 |
| 2,964,511 | Cottle | Dec. 13, 1960 |
| 3,107,238 | Hooker | Oct. 15, 1963 |

FOREIGN PATENTS

| | | |
|---|---|---|
| 533,362 | Belgium | May 16, 1955 |